United States Patent

Kanno

Patent Number: 5,875,416
Date of Patent: Feb. 23, 1999

[54] TEMPERATURE ADJUSTING METHOD AND APPARATUS THEREFOR USING AT LEAST TWO TEMPERATURE SENSORS AND A CORRECTION VALUE

[75] Inventor: Soichi Kanno, Kanagawa-ken, Japan

[73] Assignee: Tokyo Electron Limited, Tokyo, Japan

[21] Appl. No.: 787,172

[22] Filed: Jan. 23, 1997

[30] Foreign Application Priority Data

Jan. 23, 1996 [JP] Japan .................................. 8-028482

[51] Int. Cl.$^6$ ...................................................... H05B 1/02
[52] U.S. Cl. ............................................ 702/130; 702/99
[58] Field of Search ................ 364/557, 571.01–571.08; 219/490, 494, 495, 497, 506; 374/121, 124, 129, 137; 117/85, 86; 118/725, 715; 392/418; 702/85–88, 90, 99, 130

[56] References Cited

U.S. PATENT DOCUMENTS

| | | | |
|---|---|---|---|
| 4,761,538 | 8/1988 | Chiba et al. | 340/588 |
| 5,305,417 | 4/1994 | Najm et al. | 118/724 |
| 5,334,251 | 8/1994 | Nashimoto | 118/725 |
| 5,436,172 | 7/1995 | Moslehi | 250/341.1 |
| 5,702,624 | 12/1997 | Liao et al. | 340/655 |

*Primary Examiner*—Louis Arana
*Assistant Examiner*—Craig Steven Miller
*Attorney, Agent, or Firm*—Oblon, Spivak, McClelland, Maier & Neustadt, P.C.

[57] ABSTRACT

The temperature adjusting apparatus of a heat treatment equipment includes a first temperature sensor, provided close to an object to be treated in a heat treatment furnace of the heat treatment equipment for detecting a treatment temperature of a position close to the object to be treated, a second temperature sensor, provided close to an outer surface of the heat treatment furnace, for detecting a heating temperature of the heat treatment furnace, and a calculation circuit for calculating a target value of the second temperature sensor by subtracting a correction value from a set temperature of the first temperature sensor. Further included is a heat adjustment section for adjusting heating of the heat treatment furnace in accordance with a deviation between the target value of the second temperature sensor and a detection value of the second temperature sensor. There is a correction value output circuit for calculating the correction value on the basis of a difference between a detection value of the second temperature sensor converged when the detection value of the second temperature sensor has converged in the heat adjustment by the heat adjustment section and the detection value of the first temperature sensor. There is then performed an updating of the correction value when the detection value of the first temperature sensor is not equal to the set value.

12 Claims, 4 Drawing Sheets

| | SET TEMPERATURE OF SENSOR A | CORRECTION VALUE A−B | TARGET TEMPERATURE OF SENSOR B | CONTROL RESULTS | |
|---|---|---|---|---|---|
| | | | | SENSOR A | SENSOR B |
| FIRST TRIAL | 800°C | 0°C | 800°C | 820°C | 800°C |
| SECOND TRIAL | 800°C | 20°C | 780°C | 805°C | 780°C |
| THIRD TRIAL | 800°C | 25°C | 755°C | 800°C | 755°C |

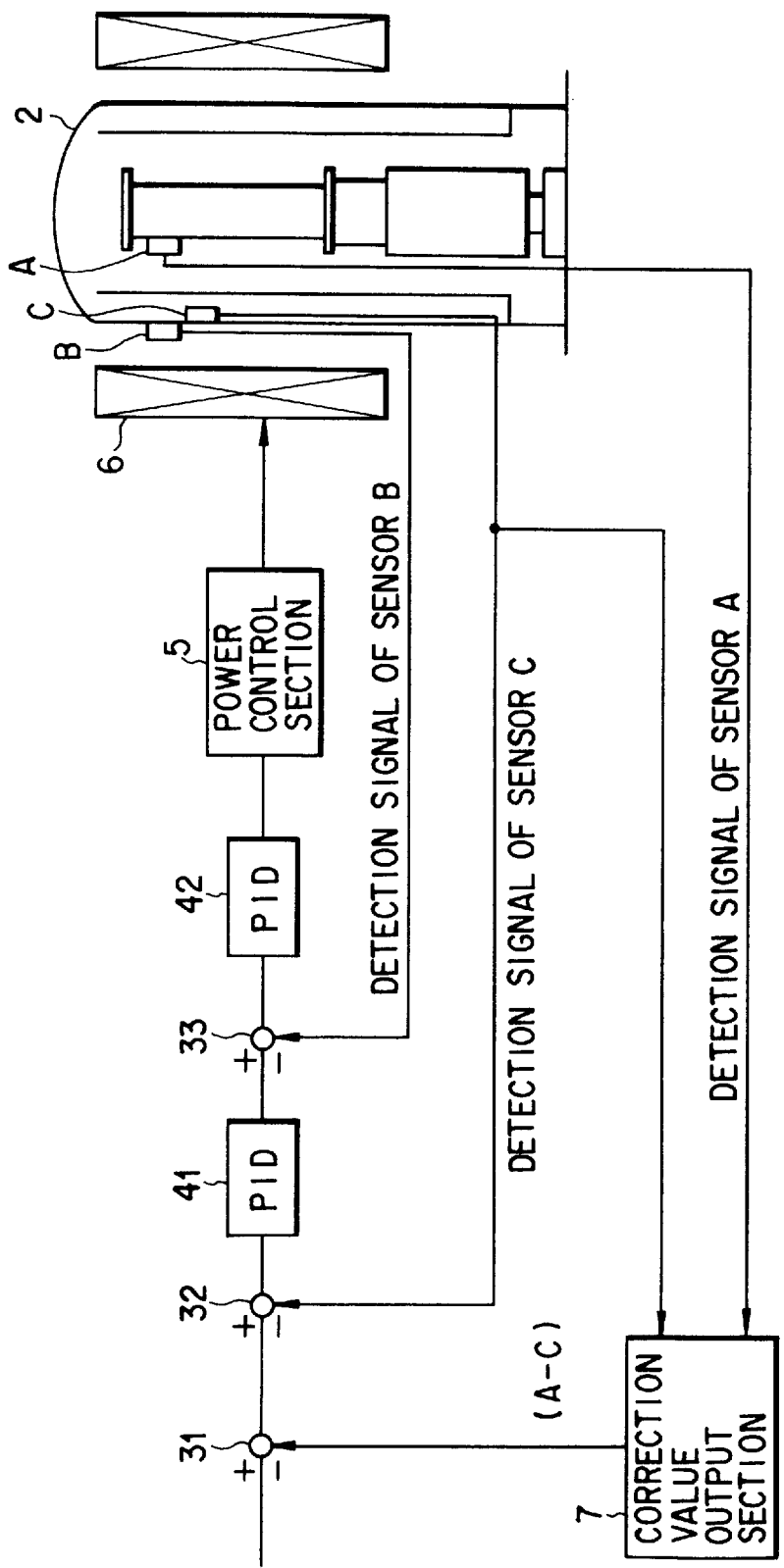
F I G. 5

TEMPERATURE ADJUSTING METHOD AND APPARATUS THEREFOR USING AT LEAST TWO TEMPERATURE SENSORS AND A CORRECTION VALUE

BACKGROUND OF THE INVENTION

The present invention relates to a temperature adjusting method and an apparatus therefor.

The manufacturing process of semiconductor devices includes heat treatments such as a chemical vapor deposit (CVD) and an oxidation treatment. One of the known examples of the device for carrying out the heat treatment in a batch scheme is a vertical type heat treatment equipment.

In the oxidation treatment using the above-mentioned device, a great number of wafers are, first, mounted on a wafer board in a rack-like manner, and the wafer board is loaded into a reaction tube having a double-tube structure. Subsequently, the inside of the reaction tube is heated to a predetermined temperature, for example, 800° by a heater, and while exhausting through an exhaust tube, a treatment gas is introduced from a gas inlet tube, thus carrying out a process.

In the above-described process, the heat treatment is carried out while maintaining the inside of the reaction 1 stably at 800°. During this process, it is necessary to control the temperature at a high accuracy, and therefore the heating is carried out while controlling the electric power supply amount to the heater by a control unit. In the control of the heater, it is ideal that a temperature sensor should be provided as close as possible to an object to be processed, that is, wafers. It is however very difficult to have such a structure, in which the temperature sensor is provided close to the wafers during a heat treatment, in terms of designing as well as the creation of contamination.

As a solution to the above drawbacks, the following countermeasures are conventionally taken. That is, a first thermo-sensor A made of, for example, a thermocouple is provided at a position close to wafers within the reaction tube, for example, on the wafer board, and a second thermo-sensor B is provided close to the outer surface of the reaction tube. Then, during the adjustment period before carrying out a process, the temperature of the thermo-sensor B, which is stabilized when the set temperature of the thermo-sensor A is stabilized, is obtained, and the difference between these temperatures is acquired in advance. Subsequently, the heater is controlled on the basis of the detection value of the thermo-sensor B during the process.

As described above, during the adjustment period, it is required that the temperature of the heater should be controlled so that the set temperature of the temperature sensor A is stabilized. During the temperature control, if only the detection signal of the thermo-sensor A is fed back so as to obtain the temperature difference, the detection value of the temperature sensor B is not easily stabilized. Therefore, when obtaining the temperature difference, the detection signals of both the thermo-sensors A and B must be fed back, and to achieve this, a cascade control system is employed.

In this case, first, a control parameter of a PID adjustment unit (PID value) is determined by use of the feedback loop of only the detection signal of the thermo-sensor A. The determination of the parameter is made by the operator by adjusting the PID value in a trial-and-error manner so that the temperature-increasing curve is optimized, as monitoring the change in the detection signal of the thermo-sensor A along with time. Then, in a similar manner, a PID value of the PID adjustment unit is determined with use of the feedback loop of the detection signal of the thermo-sensor B.

As described above, the temperature of the thermo-sensor B, which is stabilized when the set temperature of the thermo-sensor A is stabilized, is obtained. Therefore, at the time of a process, the thermo-sensor A is removed, and the reaction tube is heated while controlling the heater using the thermo-sensor B. Thus, the temperature of the vicinity close to the wafers converges to the set temperature.

However, with the conventional technique, the control parameter must be controlled on the basis of both the thermo-sensors A and B, and the adjustment operation is complicated. Further, in the above-described vertical type heat treatment equipment, the heater is divided into plural, for example, five, in the vertical direction so as to achieve the uniformity (face-to-face uniformity) of the vertical directional process temperature of the wafers mounted on the wafer board. Therefore, for each of the five heater segments, the above-described two types of the control parameters must be adjusted, thus making the adjusting operation very complicated and requiring a great deal of time.

An object of the present invention is to provide a temperature adjusting method and an apparatus therefor, which can be easily achieved and operated in the case where the difference in temperature between both of a temperature detection unit for adjustment and a temperature detection unit for processing is examined prior to carrying out a real process.

BRIEF SUMMARY OF THE INVENTION

According to the present invention, there is provided a temperature adjusting method for a heat treatment equipment, which includes setting a treatment temperature of a position close to an object to be treated, in a heat treatment furnace, to a predetermined set value; obtaining a target value of a heating temperature of the heat treatment furnace by subtracting a correction value from the set value of the treatment temperature; adjusting heating of the heat treatment furnace in accordance with a deviation between the target value of the heating temperature and a detection value of the heating temperature; and calculating the correction value on the basis of a difference between a detection value of a heating temperature converged when the detection value of the heating temperature has converged in the heat adjusting step, and the detection value of the treatment temperature, and updating the correction value when the detection value of the treatment temperature is not equal to the set value.

According to the present invention, there is further provided a temperature adjusting apparatus of a heat treatment equipment, comprising: a first temperature sensor, provided close to an object to be treated in a heat treatment furnace of a heat treatment apparatus, for outputting a first temperature signal which corresponds to a treatment temperature of a position close to the object to be treated; a second temperature sensor, provided close to an outer surface of the heat treatment furnace, for outputting a second temperature signal which corresponds to a heating temperature of the heat treatment furnace; a calculation circuit for calculating a target value of the second temperature sensor by subtracting a correction value from a set temperature of the first temperature sensor; a heat adjustment section for adjusting heating of the heat treatment furnace in accordance with a deviation between the target value of the second temperature sensor and a detection value of the second temperature sensor; and a correction value output circuit for calculating the correction value on the basis of a difference between a detection value of the second temperature sensor converged when the detection value of the second temperature sensor has converged in the heat adjustment by the heat adjustment section and the detection value of the first temperature sensor, and updating the correction value when the detection value of the first temperature sensor is not equal to the set value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a schematic diagram showing the structure of a vertical type heat treatment equipment to which a temperature adjusting apparatus according to another embodiment of the present invention is applied.

DETAILED DESCRIPTION OF THE INVENTION

An embodiment of the temperature adjusting apparatus according to the present invention will now be described with reference to the accompanying drawings.

Figure 1:
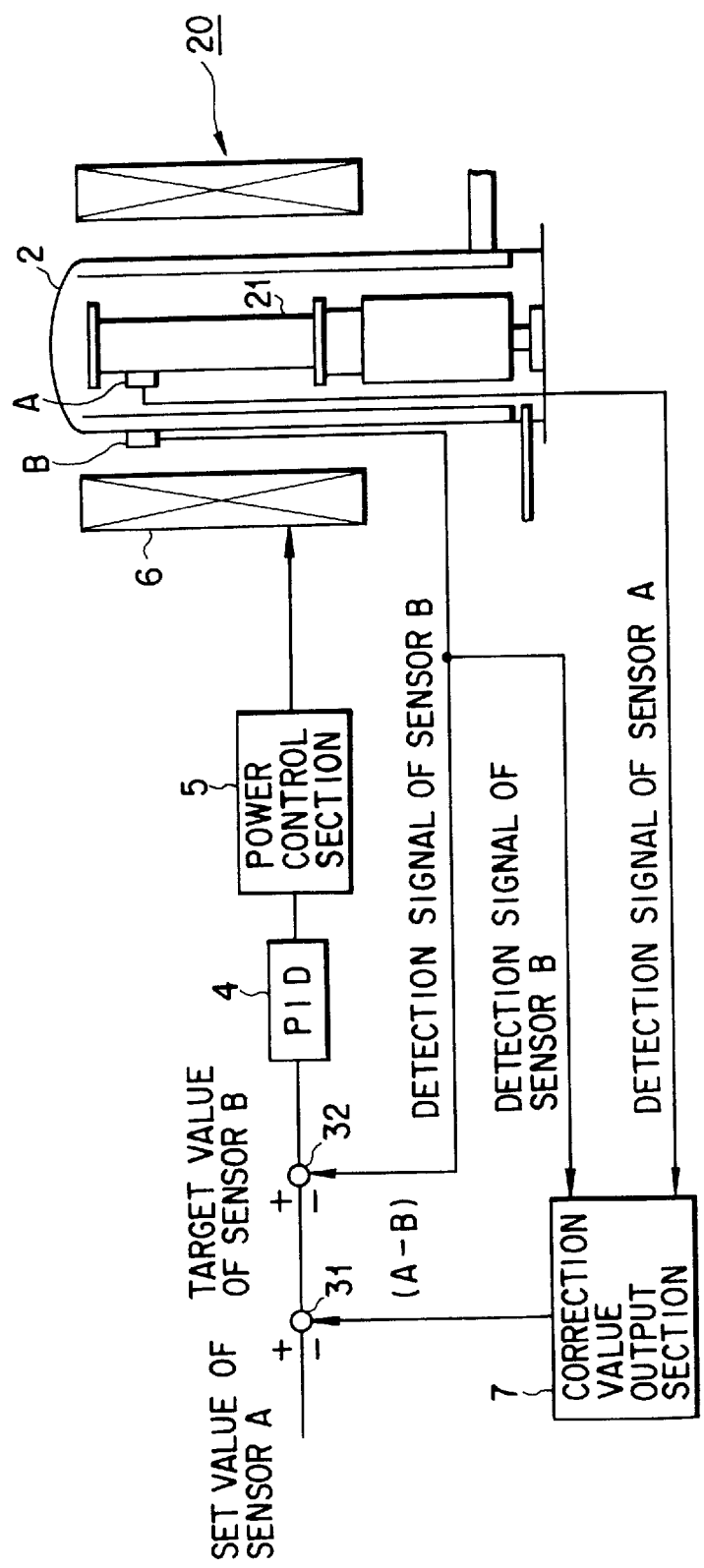
FIG. 1 is a schematic diagram showing the structure of a vertical type heat treatment equipment to which a temperature adjusting apparatus according to the first embodiment of the present invention is applied.

One of the features of the control system used in the embodiment illustrated in FIG. 1 is that the detection signal of the thermo-sensor B for process is built in the feedback loop, but the detection signal of the thermo-sensor A for adjustment is not built in the feedback loop, but used as a factor for correcting the target value of the thermo-sensor B. The following is an explanation of the control system.

In a reaction tube 2 of a vertical type heat treatment equipment, which will be explained later, there is provided a temperature detection section for adjustment (thermo-sensor A), made of a thermocouple, for example, and used for detecting the temperature at a position close to an object such as a semiconductor wafer (to be called wafer hereinafter) mounted on a wafer board 21, and at a position close to the outer surface of the reaction tube 2, a temperature detection section for process (thermo-sensor B) made of a thermocouple, for example, is provided.

A first deviation circuit section 31 serves to subtract a correction temperature value, which will be explained later, from a set temperature value of the thermo-sensor A, and extract the deviation, that is, the target value (target temperature) of the thermo-sensor B. In the post stage to the first deviation circuit 31, a second deviation circuit section 32 is provided, where the detection value of the thermo-sensor B is subtracted from the target value of the thermo-sensor B, and the deviation is output to an adjusting section provided in a further post stage, namely, a PID (proportional factor, integral factor, differential factor) adjusting section 4.

In the PID adjusting section 4, a PID operation is carried out on the basis of the deviation input, and the operation result thereof is output to a power control section 5 provided in a further post stage. In the power control section 5, the electric energy to a heater, which is the heat source for the vertical type heat treatment equipment 20, is controlled on the basis of the output value from the PID adjusting section 4. It should be noted that the control parameter of the PID control section 4 is obtained in advance in the following manner. That is, for example, a control system for feeding back the detection signal of the thermo-sensor B is assembled, and the operator adjusts the control parameters of the PID control section built in the control system so that the temperature-increasing curve of the thermo-sensor B becomes optimal.

In the meantime, the control system includes a correction value output section 7, which is one of the features of the embodiment. The correction value output section 7 has the following functions. One is to monitor the detection value of the thermo-sensor B, and another is that when the detection value converges within a certain range, the section 7 outputs a correction value, which is the value obtained by subtracting the detection value of the thermo-sensor B from the detection value of the thermo-sensor A at the time of the convergence, (A–B), to the first deviation circuit section 31 from that time onwards, whereas while the detection value of the thermo-sensor B does not converge within the certain range, the section 7 outputs the correction value which has been used so far, to the first deviation circuit section 31. Further, the correction value output section 7 has a function of determining whether or not the detection value of the thermo-sensor A is at a set value when the detection value of the thermo-sensor B converges, and outputting, when the detection value is at the set value, a previous correction value before renewal, that is, the correction value output when the previous detection value of the thermo-sensor B converged.

Figure 2:
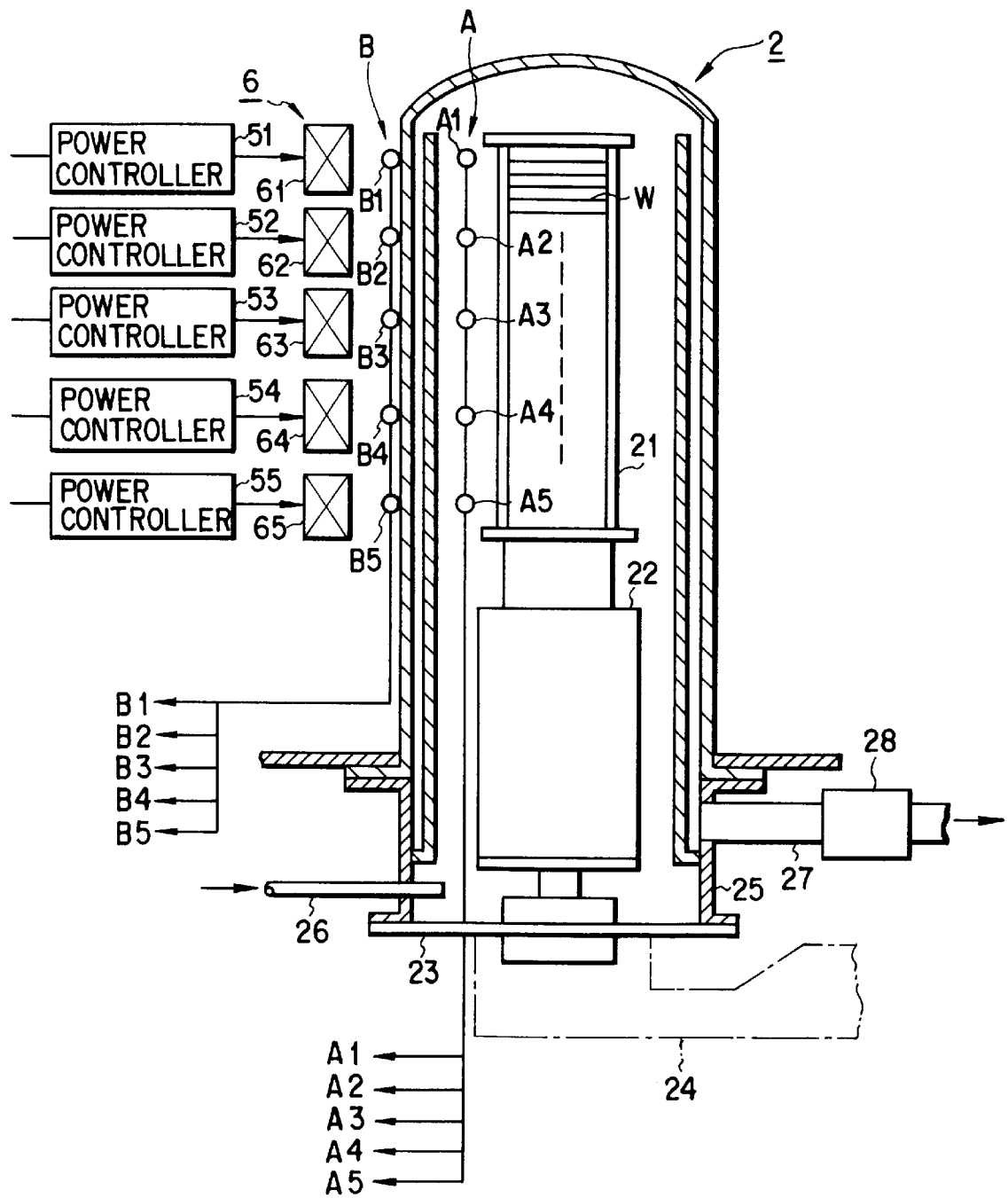
FIG. 2 is a schematic diagram showing a cross section of the vertical type heat treatment equipment to which the temperature adjusting apparatus of the present invention is applied.

The above-described vertical type heat treatment equipment will now be briefly described with reference to FIG. 2. In the reaction tube 2 having, for example, a double-tube structure, the wafer board 21 on which a great number of wafers are mounted to be loaded, is placed on the upper portion of the board elevator 24 via a cover member 23 and a heat insulation cylinder 22. The lower end of the reaction tube 2 is supported by a manifold 25. Further, a gas inlet pipe 26 for introducing a treatment gas into the reaction tube 2 is inserted into the lower side surface of the manifold 15, and an exhaust pipe 27 jointed to an exhaust pump 28 for exhausting the treatment gas is connected to the upper side surface of the manifold 15.

On an outer side of the reaction tube 2, a plurality of, for example, five heaters 6 (61, 62, 63, 64 and 65) are arranged in the vertical direction, and the power supply amount to each of the heaters 61, 62, 63, 64 and 65 is controlled respectively by power controllers 51, 52, 53, 54 and 55 of a power control section 5. Further, a thermo-sensor A, that is, each of five thermo-sensors A1, A2, A3, A4 and A5 arranged in the vertical direction is provided at positions close to the wafers in the reaction tube 2, for example, close to the wafer board 21, so as to correspond to the respective positions of the heaters 6. Also, a thermo-sensor B, that is, each of five thermo-sensors for process B1, B2, B3, B4 and B5 arranged in the vertical direction is provided at positions close to the outer surface of the reaction tube 2. It should be noted that in the description of FIG. 1, only one pair of the heaters and thermo-sensors will be discussed as a typical example.

Next, a specific temperature adjusting method using the above apparatus will now be explained with reference to FIGS. 1 and 3. In this method, an actual temperature adjustment is carried out by a computer via a software, and as mentioned before, the control parameter of the thermo-sensor B is obtained in advance. First, in the step S1, the target temperature of the thermo-sensor B is set at a set temperature of the thermo-sensor A. For example, if it is desired that the detection temperature value of the thermo-sensor A should be set to 800°, the target temperature value of the thermo-sensor B is, first, set to 800°. In this manner, the correction value (A−B) input to the first deviation circuit section 31 shown in FIG. 1 is handled as 0.

Next, in the step S2, the power supply amount for the heater 6 is PID-controlled so that the detection value of the thermo-sensor B becomes the target temperature value. During this period, it is checked whether or not the detection value of the thermo-sensor B is equal to the target temperature value (the step S3). If the detection value is equal to the target value, it is subsequently checked whether or not the detection value of the thermo-sensor A is equal to the set temperature value (the step S4). If the detection value is equal to the set temperature value, this routine is finished, and if not, the correction value (A−B) is calculated (the step S5), and the target temperature value of the thermo-sensor B is corrected to a value obtained by subtracting the correction value from the set temperature of the thermo-sensor A (the step S6). Then, the operation returns to the step S2.

Figures 3, 4:
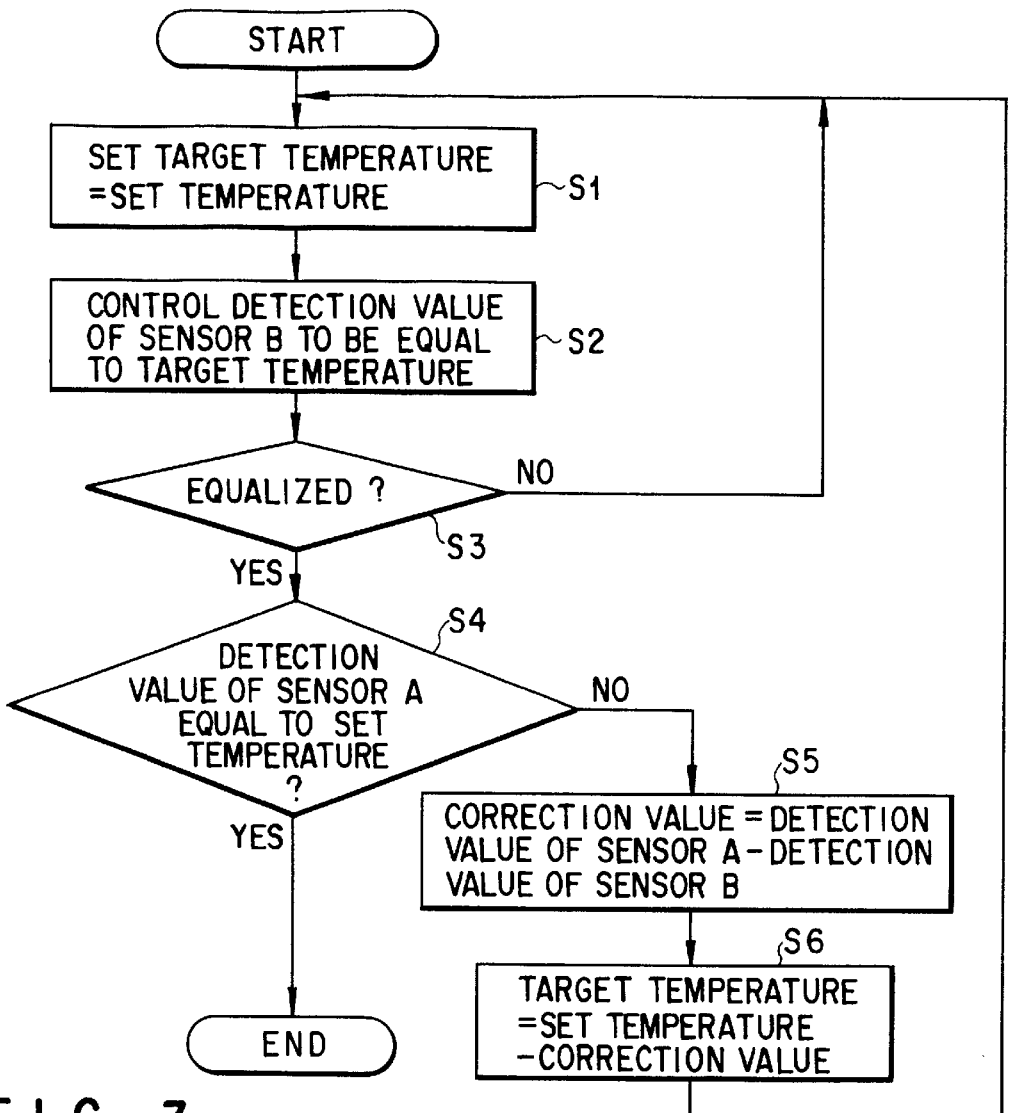
FIG. 3 is a flowchart illustrating an adjustment step of a temperature adjusting method of the present invention.
FIG. 4 is a table containing specific numerical values, designed to explain the adjustment step of the temperature adjusting method of the present invention with specific numerical values.

FIG. 4 shows the flow of the above-described operation, illustrated using specific numeral values. As can be seen in FIG. 4, in the case where the detection value of the thermo-sensor A is set finally to 800°, in the first cycle, the PID control is carried out by setting the target temperature of the thermo-sensor B to 800°, and thus the detection value of the thermo-sensor becomes 800°. At this time, the detection value of the thermo-sensor A becomes 820°. Subsequently, in the second cycle, the difference between the detection value of the thermo-sensor A and the detection value of the thermo-sensor B in the first cycle, (A−B=20°) is used as the correction value, and the PID control is carried out as the target temperature value of the thermo-sensor B is lowered by the correction value from the target value of the first cycle, to 780°. In the second cycle, when the detection value of the thermo-sensor B is stabilized to 780°, the detection value of the thermo-sensor A becomes 805°. In the following third cycle, the correction value is obtained as A (805°)−B (780°)=25°, and the target temperature of the temperature sensor B becomes 775° (800° (the final value of the thermo-sensor A)−25°).

In the embodiment of the present invention, the detection signal of the thermo-sensor B is built in the feedback loop, and the target value of the thermo-sensor B is first used as the set value of the thermo-sensor A. Then, the detection signal of the thermo-sensor A is not built in the feedback loop but used for the calculation of the correction value. Thus, the target value of the thermo-sensor B is appropriately corrected bit by bit on the basis of the difference between the detection value of the thermo-sensor A and the detection value of the thermo-sensor B so that the detection value of the thermo-sensor A becomes close to the set value, and the detection value of the thermo-sensor A converges to the set value. However, the original target value of the thermo-sensor B does not always have to be equal to the set value of the thermo-sensor A.

As described, the adjustment step continues until the detection value of the thermo-sensor A converges to the set value. The above-described adjusting operation is carried out by use of the thermo-sensors A1 and B1 in the case of the heater 61, for example, and as regards the rest, namely, the four heaters 62 to 65, the adjusting operation is carried out in a similar manner on the basis of the respective detection signals of the thermo-sensors (A2, B2), the thermo-sensors (A3, B3) and the thermo-sensors (A4, B4). Thus, in the adjusting step, the detection value of the thermo-sensor B at the time when the detection value of the thermo-sensor A converges to the set value is obtained. After that, in a real process of heat treatment, the thermo-sensor A for adjustment is removed, and the temperature of the heater 6 is controlled on the basis of the detection value of the thermo-sensor B for process.

Therefore, in the adjustment operation for obtaining the temperature difference between the detection value of the thermo-sensor A and the detection value of the thermo-sensor B, it suffices if the adjustment of the control parameter, that is, the PID value in this embodiment, which is cumbersome, is carried out only for the thermo-sensor B. Thus, the adjustment of the control parameter can be easily achieved. Further, after obtaining the control parameter regarding the thermo-sensor B, the operation for stabilizing the temperature of the thermo-sensor A is automatically performed. Therefore, such an operation can be performed, for example, during a night time without attendance of the operator. Consequently, the efficiency of the heat treatment can be improved.

Next, another embodiment of the present invention will now be described. In this embodiment, a thermo-sensor C is added between the thermo-sensor A and the thermo-sensor B, for example, a position close to the inner surface of the outer tube of the reaction tube 2, to the structure of the previous embodiment. Similarly, as to the control system, the feedback loop of the thermo-sensor C is added to the system of the previous embodiment. For example, in the control system shown in FIG. 5, the detection signal of the thermo-sensor B is built in a minor loop and the detection signal of the thermo-sensor C is built in a major loop, and the output signal from the first deviation circuit section 31 is set as the target value of the thermo-sensor C. It should be noted that a third deviation circuit 33, a first PID adjusting section 41 and a second PID adjusting section 42 are provided in a similar manner to that of the first embodiment.

In this embodiment, the difference between the detection value of the thermo-sensor A and the detection value of the thermo-sensor C is used as the correction value, and when the detection values of the thermo-sensor A and the thermo-sensor C are stabilized, the correction value (A−C) is output to the first deviation circuit 31. More specifically, in order to set the detection temperature of the thermo-sensor A to 800°, the target temperature of the thermo-sensor B is, first, set to 800°, and the electric energy to the heater 6 is PID-controlled. During this period, it is checked whether or not the detection value of the thermo-sensor C is equal to the target temperature (800°). If not, the correction value (A−C) is calculated, and subtracted from the set value by the first deviation circuit 31 to obtain the target value of the thermo-sensor C. The output signal of the first deviation circuit 31, i.e., the target value of the thermo-sensor C is subtracted by the detection value of the thermo-sensor C in the second deviation circuit 32 to obtain a deviation between the target value and detection value of the thermo-sensor C. The deviation is input to the PID adjusting section 41.

In the PID adjustment section 41, a PID operation is carried out on the basis of the deviation to obtain a target temperature of the thermo-sensor B. The output signal of the PID adjusting section 41, i.e., the target temperature of the thermo-sensor B is subtracted by the detection signal of the thermo-sensor B in the third deviation circuit 33 to obtain a deviation between the target value and detection value of the thermo-sensor of the thermo-sensor B. The deviation is input to the PID adjusting section 42.

In the PID adjusting section 42, a PID operation is carried out on the basis of the deviation, and the PID operation result is output to the power control section 5.

The power control section 5 controls the electric energy to a heater 6 on the basis of the output value from the PID adjusting section 42.

In other words, according to the FIG. 5 embodiment, the pre-stage PID adjusting section 41 performs the PID control for obtaining the target temperature of the thermo-sensor B and the rear-stage PID adjusting section 42 performs the PID control for controlling the electric energy to the heater 6 on the basis of the target temperature of the thermo-sensor B.

In this case, it only suffices if the control parameter is determined with regard to the thermo-sensors B and C, and this operation is not necessary as for the thermo-sensor A. Thus, the adjusting operation can be simplified.

As described above, in the present invention, two or more thermo-sensors for process (the thermo-sensors B and C in this embodiment) are used, and the convergence temperature of the plurality of sensors for process is examined in advance by use of sensors for adjustment. Then, using the sensors for process, the temperature is controlled during a real process.

According to the present invention, in the case where the difference in temperature between both of a temperature detection unit for adjustment and a temperature detection unit for processing is examined prior to carrying out a real process, the temperature adjusting operation can be easily carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A temperature adjusting method for a heat treatment apparatus, comprising the steps of:

setting a treatment temperature of a position close to an object to be treated in a heat treatment furnace, to a predetermined set value;

obtaining a target value of a heating temperature of the heat treatment furnace by subtracting a correction value from the set value of the treatment temperature;

adjusting heating of the heat treatment furnace in accordance with a deviation between the target value of the heating temperature and a detection value of the heating temperature; and calculating the correction value on the basis of a difference between a detection value of a heating temperature converged at a time when the detection value of the heating temperature has converged in the heat adjusting step, and a detection value of the treatment temperature detected at said time, and updating the correction value when the detection value of the treatment temperature is not equal to the set value.

2. A temperature adjusting method according to claim 1, wherein the heat adjusting step includes a PID adjusting step in which a PID operation is carried out on the basis of the deviation, and the heating temperature of the heat treatment furnace is adjusted on the basis of a result of the PID operation.

3. A temperature adjusting apparatus of a heat treatment equipment, comprising:

first temperature detection means, provided close to an object to be treated in a heat treatment furnace of a heat treatment equipment, for outputting a first temperature signal which corresponds to a treatment temperature of a position close to the object to be treated;

second temperature detection means, provided close to an outer surface of the heat treatment furnace, for outputting a second temperature signal which corresponds to a heating temperature of the heat treatment furnace;

calculation means for calculating a target value of the second temperature detection means by subtracting a correction value from a set temperature of the first temperature detection means;

heat adjustment means for adjusting heating of the heat treatment furnace in accordance with a deviation between the target value of the second temperature detection means and a detection value of the second temperature detection means; and correction value output means for calculating the correction value on the basis of a difference between a detection value of the second temperature detection means converged when the detection value of the second temperature detection means has converged in the heat adjustment by the heat adjustment means, and the detection value of the first temperature detection means, and updating the correction value when the detection value of the first temperature detection means is not equal to the set value.

4. A temperature adjusting apparatus according to claim 3, wherein the heat adjustment means includes a PID adjusting apparatus for carrying out a PID operation on the basis of the deviation, and adjusting the heating temperature of the heat treatment furnace on the basis of a result of the PID operation.

5. A temperature adjusting apparatus according to claim 3, wherein the heat adjustment means includes heater means provided on an outer periphery of the heat treatment furnace, a PID adjustment means for carrying out a PID operation on the basis of the deviation, and outputting a PID signal, and power control means for controlling power supplied to the heater means in accordance with the PID signal of the PID adjustment means.

6. A temperature adjusting apparatus according to claim 5, wherein the heater means includes a plurality of heaters arranged in a vertical direction in an outer periphery of the heat treatment furnace, the PID adjustment means outputs a plurality of PID adjustment signals to the plurality of heaters, respectively, and the power control means controls power supplied to each of the plurality of heaters in accordance with the PID signals from the PID adjustment means.

7. A temperature adjusting apparatus of a heat treatment equipment, comprising:

first temperature detection means, provided close to an object to be treated in a heat treatment furnace of a heat treatment apparatus, for outputting a first temperature signal which corresponds to a treatment temperature of a position close to the object to be treated;

second temperature detection means, provided close to an outer surface of the heat treatment furnace, for outputting a second temperature signal which corresponds to a heating temperature of the heat treatment furnace;

third temperature detection means, provided on an inner surface of the heat treatment furnace, for outputting a third temperature signal which corresponds to an inner surface temperature of the heat treatment furnace;

calculation means for calculating a target value of the third temperature detection means by subtracting a correction value from a set temperature of the first temperature detection means;

calculating means for calculating a target value of the second temperature detection means on the basis of the target value of the third temperature detection means and the detection value thereof;

heat adjustment means for adjusting heating of the heat treatment furnace in accordance with a correction value corresponding to a deviation between the target value of the second temperature detection means and a detection value thereof; and correction value output means for calculating the correction value on the basis of a difference between the target value of the second temperature detection means converged and the detection value thereof, when the detection values of the second and third temperature detection means have converged in the heat adjustment by the heat adjustment means, and updating the correction value when the detection value of the first temperature detection means is not equal to the set value.

8. A temperature adjusting apparatus according to claim 7, wherein the heat adjustment means includes a PID adjusting device for carrying out a PID operation on the basis of the deviation, and adjusting the heating temperature of the heat treatment furnace on the basis of a result of the PID operation.

9. A temperature adjusting apparatus according to claim 7, wherein the heat adjustment means includes heater means provided on an outer periphery of the heat treatment furnace, PID adjustment means for carrying out a PID operation on the basis of the deviation, and outputting a PID control signal, and power control means for controlling power supplied to the heater means in accordance with the PID control signal of the PID adjustment means.

10. A temperature adjusting apparatus according to claim 9, wherein the heater means includes a plurality of heaters arranged in a vertical direction in an outer periphery of the heat treatment furnace, the PID adjustment means outputs a plurality of PID signals to the plurality of heaters, respectively, and the power control means controls power supplied to each of the plurality of heaters in accordance with a plurality of PID signals from the PID adjustment means.

11. A temperature adjusting method of a heat treatment equipment for heat-treating an object to be treated by heating it using a heat source, comprising the steps of:

controlling the heat source on the basis of an output signal from an adjustment section by feeding back a detection signal of a temperature detection section for process, to an input side of the adjustment section, and determining an appropriate value of a control parameter of the adjustment section on the basis of a result of the control; and stabilizing detection values of the temperature detection section for process and a temperature detection section for adjustment, by use of the control parameter determined in the first step;

the stabilizing step further comprising the steps of:

(a) calculating a target value of the temperature detection section for process by subtracting a correction value from a set value;

(b) controlling a power supply amount of the heat source by feeding back the detection value of the temperature detection section for process to the adjustment section, so that the detection value of the temperature detection section for process converges to the target value; and (c) determining, when the detection value of the temperature detection section for process has converged to the target value, whether or not the detection value of the temperature detection section for adjustment at this time is equal to the set value, and updating, if not equal, the correction value with a difference between the detection value of the temperature detection section for adjustment at this time, and the detection value of the temperature detection section for process;

the steps (a) to (c) being repeated until the detection value of the temperature detection section for adjustment becomes equal to the set value.

12. A temperature adjusting apparatus comprising:

a temperature detection section for adjustment and a temperature detection section for process, provided in an equipment for heat-treating an object to be processed, by heating it using a heat source;

a first deviation circuit section for calculating a target value of the temperature detection section for process by subtracting a correction value from a set value;

a second deviation circuit section, provided in a posterior stage to the first deviation circuit section, for obtaining a deviation between the target value and the detection value of the temperature detection section for process;

an adjustment section, provided in a post stage to the second deviation circuit section, for outputting a control signal for the heat source on the basis of the deviation;

a power control section, provided in a post stage to the second deviation circuit section, for controlling a power supply amount of the heat source on the basis of the control signal of the adjustment section; and a correction value output section for monitoring if the detection value of the temperature detection section for process converges to the target value as the detection values of the temperature detection section for process and the temperature detection section for adjustment are taken in, determining, when it is determined that the detection value converges within a certain range, whether or not the detection value of the temperature detection section for adjustment at this time is stabilized to the set value, and outputting, if not stabilized, a difference between the detection value of the temperature detection section for adjustment at this time and the detection value of the temperature detection section for process to the first deviation circuit section as a correction value.

* * * * *